United States Patent [19]

Burghardi

[11] Patent Number: 4,692,265

[45] Date of Patent: Sep. 8, 1987

[54] DRYING COMPOSITION AND METHOD

[75] Inventor: Stephen R. Burghardi, Minnetonka, Minn.

[73] Assignee: Domain, Inc., New Richmond, Wis.

[21] Appl. No.: 623,336

[22] Filed: Jun. 22, 1984

[51] Int. Cl.$^4$ .......................... C09K 3/00; F26B 3/00; A23K 3/02

[52] U.S. Cl. .......................................... 252/194; 34/9; 47/DIG. 11; 56/DIG. 23; 252/174.14; 426/425; 426/426; 426/443; 426/635; 426/636; 426/640

[58] Field of Search ........... 252/135, 194, 106, 174.14; 426/506, 636, 635, 472, 443, 507, 640, 426, 425; 47/DIG. 11; 34/9; 56/DIG. 23

[56]         References Cited

FOREIGN PATENT DOCUMENTS 2028507   3/1977   Japan .
8005382   2/1978   Japan .
0886882  12/1981   U.S.S.R. .............................. 426/636

OTHER PUBLICATIONS

Hawley, G., 1981, The Condensed Chemical Dictionary, 10th Edition, Van Nostrand Reinhold Company, p. 951.
Tietz, N., 1982, Chemical Cuts Hay-Drying Time, The Farmer, Sep. 18, p. 11.
Rotz, C. et al., 1982, Mechanical and Chemical Conditioning to Speed Alfalfa Drying, ASAE Paper No. 82-1036, Jun.
Anderson, 1982, Faster Hay Drying, Forage Fever, Jun., pp. 1-4, U.S. Department of Agriculture.
Minson, D. et al., 1981, K-Hay . . . , A Progress Report, Information Service (Australia), Sheet No. 41-2, May.

*Primary Examiner*—John F. Terapane
*Assistant Examiner*—Howard J. Locker
*Attorney, Agent, or Firm*—James R. Haller

[57]           ABSTRACT

Legumes and other plants can be dried quickly by contacting them with an aqueous solution of a mixture of carbonates consisting essentially of at least about 20% by weight of sodium sesquicarbonate, at least about 20% by weight of sodium carbonate and at least about 5% by weight of potassium carbonate, all based upon the total dry carbonate weight. The solution desirably is free of undissolved materials.

7 Claims, No Drawings

DRYING COMPOSITION AND METHOD

FIELD OF THE INVENTION

This invention is in the field of agriculture and particularly relates to a composition and method for rapidly drying plants such as legumes, berries such as grapes, and the like.

BACKGROUND OF THE INVENTION

It is often desirable to rapidly dry agricultural products. The resistance of alfalfa to mold growth, for example, increases significantly if the moisture content of the alfalfa can be reduced quickly following cutting to a value not greater than about 25% by weight. Alfalfa and other legumes commonly are field-dried before they are baled or otherwise collected for subsequent use as animal feed. Such plants tend to dry rather slowly in open fields, and commonly about two to five days are required following cutting for the moisture content of alfalfa to fall below about 25% by weight in the Upper Midwestern portion of the United States. Humid weather can substantially lengthen the drying period. The longer a crop lies drying in a field, of course, the more likely a crop is to be rained upon or to be otherwise subjected to high moisture conditions which favor mold growth. Rapid drying is hence highly desirable to reduce mold growth.

DESCRIPTION OF THE PRIOR ART

The concept of rapidly drying plant materials may be traced back to ancient Roman times in which grapes were dried by dipping them in a mixture of wood ashes and olive oil. Australian researchers recently have reported that potassium carbonate can be employed as a drying agent for alfalfa. Other researchers have reported the successful use of a drying agent used as a crop spray and comprising a water emulsion of potassium carbonate (or less desirably, sodium carbonate), methyl lardate or methyl tallowate, and an emulsifying agent.

The technical mechanism by which potassium carbonate in a water emulsion hastens the drying of legumes or other plants does not appear to be understood. The field drying of legumes is highly dependent upon such variables as air temperature, moisture content of the air and wind velocity. Having withstood the test of time from ancient Roman days, potassium carbonate appears to be the drying ingredient of choice in an aqueous emulsion, but no technically supportable mechanism appears to have been advanced to explain how or why an emulsion of this compound operates to hasten the drying of plant materials.

BRIEF DESCRIPTION OF THE INVENTION

The invention provides an inexpensive, efficient drying composition for drying alfalfa and other legumes, grapes and the like. It has been found that a solution of three specific but different carbonate compounds in water, when applied to plant materials, substantially hastens the rate at which the plant materials lose water and, hence, "dry". The carbonate compounds are sodium sesquicarbonate, sodium carbonate and potassium carbonate. The solution contains, on the basis of total dry carbonate weight, at least about 20% by weight of sodium sesquicarbonate, at least about 20% by weight of sodium carbonate and at least about 5% by weight of potassium carbonate. Preferably, the solution includes approximately one-third by weight of each of sodium sesquicarbonate, sodium carbonate and potassium carbonate based on the total dry carbonate weight. These carbonates are soluble in water in the concentrations used herein, and an aqueous solution thereof may conveniently be applied to plants by known spraying procedures. The aqueous solution desirably is substantially free of solid particulate or otherwise undissolved material which otherwise might settle out or tend to clog or otherwise interfere with spray applicators.

Hence, in one embodiment, the invention relates to a water-soluble, dry, particulate mixture comprising at least about 20% by weight of sodium sesquicarbonate, at least about 20% by weight of sodium carbonate, and at least about 5% by weight of potassium carbonate, the mixture being readily soluble in water to provide an aqueous solution which can be sprayed or otherwise applied to plant material to be rapidly dried.

In another embodiment, the invention relates to an aqueous solution which can be sprayed or otherwise applied to plant materials to be dried, the aqueous solution containing a mixture of carbonates including at least about 20% by weight of sodium sesquicarbonate, at least about 20% by weight of sodium carbonate, and at least about 5% by weight of potassium carbonate, all based upon the total dry weight of the carbonates.

In yet another embodiment, the invention relates to a method for drying plants which comprises contacting them with an effective quantity of the above-described aqueous solution, the solution desirably being essentially free of particulate or other undissolved materials.

DETAILED DESCRIPTION OF THE PREFERRED EMBODIMENT

Sodium sesquicarbonate (hereinafter sometimes referred to as "NaSC", is a compound of the formula $Na_2CO_3NaHCO_3$. It is commercially available and is found in nature generally as the dihydrate. The weight percentages set out herein refer to the dihydrate. Aqueous solutions of the compound are mildly alkaline, and the compound is available in the form of small crystals or grains. In the present invention, NaSC preferably is employed as the dihydrate in particulate form, that is, as easily dissolved, fine granules or powders. Sodium carbonate ($Na_2CO_3$) and potassium carbonate ($K_2CO_3$) are well-known compounds, are generally readily soluble in water, and form slightly alkaline solutions. These compounds are employed in the present invention in particulate form, that is, as fine granules or powders.

The relative amounts of each of sodium sesquicarbonate, potassium carbonate and sodium carbonate can be varied within reasonable limits. A carbonate mixture comprising approximately one-third by weight each of the sodium sesquicarbonate, sodium carbonate and potassium carbonate based upon total dry carbonate weight has given excellent results. The carbonate mixture should contain not less than about 20% of sodium sesquicarbonate and, similarly, not less than about 20% of the sodium carbonate. The amount of potassium carbonate should be at least about 5% by weight.

In a preferred embodiment, the carbonate mixture of the instant invention is employed to form an aqueous solution that is essentially free of undissolved material. Particularly, the aqueous solutions desirably are free from fatty acid esters such as methyl tallowate. In comparison to prior art emulsions which of necessity employed fatty acid esters such as olive oil or methyl tallowate as necessary ingredients, the solutions of the present invention do not clog or otherwise interfere with the operation of spraying devices, nor do the solutions tend to settle or separate over periods of time. Since the solid ingredients—preferably consisting essentially of the mixture of carbonates as above described—can be readily stored in admixture and can be supplied in dry, powdered form, they can be readily added to water shortly before application of the resulting solution to plants to be dried. Mixing hence is simplified inasmuch as the user need mix only a given quantity of the mixed, stable dry carbonate composition into a given quantity of water, rather than attempt to separately mix together measured quantities of a non-soluble fatty acid ester, a carbonate and water.

The aqueous solutions of the invention desirably contain from between about 1% and about 7% of sodium sesquicarbonate, from about 1% to about 7% of sodium carbonate, and from about 0.25% to about 7% of potassium carbonate. Desirably, the total concentration of carbonates does not exceed about 20% by weight of the solution, and most preferably does not exceed about 10% by weight of the solution.

Although the carbonates can be added to a volume of water in any desired order, it is desirable to first form a mixture of the desired carbonates in a desired ratio, and, shortly before use, dissolve the carbonate mixture in an appropriate quantity of water. The mixture readily dissolves in even cold water, particularly when the total quantity of carbonates is not greater than about 5% by weight of the solution. The solution can then be applied to plants as or after they are cut, to berries, grapes, and the like. For alfalfa and other legumes, the solution may be sprayed onto the plants. In one method, a crop mowing machine is provided with a spray bar positioned in front of the cutters, the spray bar being supplied with the aqueous solution of the invention from a reservoir carried by the machine and the bar including commonly available spray nozzles along its length. When the crop to be cut and dried is alfalfa, the spray bar may be supported approximately 28" (about 0.7 meters) above the ground. A push bar may be carried ahead of and parallel to the spray bar for the purpose of bending the plants over and exposing their stems to spray from the spray bar. The stems may be fractured if desired, using known crop crimping devices. Desirably, sufficient solution is employed to substantially wet the surfaces of the plants that are contacted with spray.

The quantity of solution that is applied to field crops per unit area of the field may vary widely, but typically may be in the range of from about 3 to about 75 gallons per acre (about 2.8 to about 70 dekaliters per hectare) and more desirably from about 5 to about 30 gallons per acre (about 4.7 to about 28 dekaliters per hectare).

Once plants are wetted with solutions of the invention, the plants tend to lose water to the atmosphere more rapidly than plants that have not been so treated. As a result, plants treated with the drying composition of the invention, since they dry more quickly, can be removed from a field more rapidly to thereby reduce the likelihood that the cut crop will be rained upon or subjected to high humidity conditions for long periods of time.

EXAMPLE

A one-year old stand of alfalfa was harvested using a swather producing a windrow approximately 42" wide. A 55-gallon tank (for application of candidate drying compositions) and pump were mounted on the rear of the swather. To a pushbar mounted in front of the swather reel were mounted spray units for directing droplets against the alfalfa. The alfalfa of different windrows was wetted with different drying compositions, as explained further below. Windrow moisture concentrations were determined by cutting samples from windrows with modified pruning shears, the samples being placed in paper sacks inside plastic bags and weighed. The samples were then dried at 140° F for 48 hours to eliminate moisture, and then were re-weighed. The data reported below were obtained on the fourth cutting of the field, and the field was harvested between about 9:00 a.m. and noon in late summer. Samples were taken from the windrows at about 8:00 p.m. on the harvest day, at 8:00 a.m., 12:00 noon and 8:00 p.m. on the first day following the harvest day, and at 8:00 a.m. and 2:30 p.m. on the second day following the harvest. The compositions are as follows:

Composition A:
  A commercial composition sold under the tradename Cut-N-Dry by Domain, Inc. and consisting of fifty pounds of sodium sesquicarbonate, 5 gallons of methyl lardate, and water to make 200 gallons of emulsion.

Composition B:
  2.5 pounds each of sodium sesquicarbonate, sodium carbonate and potassium carbonate were added to sufficient water to make 5 gallons of solution.

Composition C:
  One and two-thirds pounds each of sodium sesquicarbonate, sodium carbonate and potassium carbonate were added to sufficient water to make 5 gallons of solution.

Composition D:
  Approximately .83 pounds each of sodium sesquicarbonate, sodium carbonate and potassium carbonate were added to sufficient water to make 5 gallons of solution.

In the Table, those numbers in each vertical column that are marked with the same letter are not significantly different as determined by Wisart's test of significance in the analysis of covariance. As will be noted from the Table, the compositions of the invention were as effective in drying the alfalfa as were the commercial drying compositions. Because the solutions of the instant invention were substantially free of undissolved matter, the spraying equipment did not tend to clog or malfunction and could easily be cleaned when spraying had been completed.

TABLE 1

| Composition | Application and Harvest Time | % of Moisture | | | | | |
|---|---|---|---|---|---|---|---|
| | | Harvest Day 8:00 A.M. | 1st Day After Harvest 8 a.m.–12 N.–8 p.m. | | | 2nd Day After Harvest 8 a.m.–2:30 p.m. | |
| A, 30 gallons/acre, coarse spray | 9:06 A.M. | 32.5 a | 51.6 a | 47.5 a | 17.1 a | 21.3 a | 9.9 a |
| Untreated Check | 9:07 A.M. | 41.5 | 54.6 | 55.3 | 25.6 | 27.8 | 15.9 |
| A, 5 gallons/acre, fine spray | 9:42 A.M. | 39.7 b | 54.8 b | 55.9 b | 20.8 bc | 27.8 b | 11.9 a |

TABLE 1-continued

| Composition | Application and Harvest Time | % of Moisture | | | | | |
|---|---|---|---|---|---|---|---|
| | | Harvest Day 8:00 A.M. | 1st Day After Harvest 8 a.m.–12 N.–8 p.m. | | | 2nd Day After Harvest 8 a.m.–2:30 p.m. | |
| Untreated Check | 9:38 A.M. | 46.0 | 56.8 | 62.1 | 27.9 | 27.4 | 15.4 |
| B, 5 gallons/acre, fine spray | 9:57 A.M. | 41.4 b | 54.7 b | 51.6 ab | 18.8 ab | 22.1 a | 10.9 a |
| Untreated Check | 10:25 A.M. | 44.5 | 55.3 | 54.0 | 25.3 | 28.7 | 15.3 |
| C, 5 gallons/acre, fine spray | 11:18 A.M. | 38.9 b | 51.5 a | 47.9 ab | 20.1 b | 23.0 a | 11.0 a |
| Untreated Check | 11:11 A.M. | 43.3 | 54.7 | 50.4 | 26.7 | 29.0 | 15.9 |
| D, 5 gallons/acre, fine spray | 11:38 A.M. | 42.7 bc | 55.3 b | 59.5 b | 24.0 c | 25.5 a | 12.6 a |
| Untreated Check | 11:32 A.M. | 42.7 | 54.9 | 54.6 | 27.6 | 28.4 | 17.7 |

While a preferred embodiment of the present invention has been described, it should be understood that various changes, adaptations and modifications may be made therein without departing from the spirit of the invention and the scope of the appended claims.

What is claimed is:

1. A drying composition for plants comprising an aqueous, sprayable solution essentially free of water-insoluble ingredients and consisting essentially of sodium sesquicarbonate in an amount not less than about 20% by weight, potassium carbonate in an amount not less than about 5% by weight and sodium carbonate in an amount not less than about 20% by weight, all based upon the total dry carbonate weight.

2. The composition of claim 1 wherein said mixture contains approximately equal quantities by weight of sodium sesquicarbonate, sodium carbonate and potassium carbonate.

3. The composition of claim 1 in which sodium sesquicarbonate, potassium carbonate and sodium carbonate are present in said solution in approximately equal amounts.

4. A method for drying plants which comprises wetting plants with the composition of claim 5.

5. A method of hastening the rate at which plants dry which comprises applying to the plants an aqueous solution of a mixture of carbonates containing, based on the total carbonate dry weight, at least about 20% by weight of sodium sesquicarbonate, at least about 20% by weight of sodium carbonate, and at least about 5% by weight of potassium carbonate, said solution being essentially free of water-insoluble ingredients.

6. The method of claim 5 including the step of dissolving in water a dry blend of said carbonates to provide said aqueous solution.

7. The method of claim 5 including the step of dissolving, in water, a mixture of carbonates consisting essentially of approximately equal quantities by weight of sodium sesquicarbonate, sodium carbonate and potassium carbonate.

* * * * *